United States Patent
Yang (10) Patent No.: US 10,678,249 B2
(45) Date of Patent: Jun. 9, 2020

(54) SYSTEM AND METHOD FOR CONTROLLING A VEHICLE AT AN UNCONTROLLED INTERSECTION WITH CURB DETECTION

(71) Applicant: Honda Motor Co., Ltd., Tokyo (JP)

(72) Inventor: Shuowei Yang, Troy, MI (US)

(73) Assignee: Honda Motor Co., Ltd., Tokyo (JP)

( * ) Notice: Subject to any disclaimer, the term of this patent is extended or adjusted under 35 U.S.C. 154(b) by 127 days.

(21) Appl. No.: 15/957,975

(22) Filed: Apr. 20, 2018

(65) Prior Publication Data

US 2019/0324464 A1    Oct. 24, 2019

(51) Int. Cl.
    *G05D 1/02*         (2020.01)
    *G06N 5/04*         (2006.01)
    *H04L 29/08*      (2006.01)

(52) U.S. Cl.
    CPC ............. *G05D 1/0214* (2013.01); *G06N 5/04* (2013.01); *G05D 2201/0213* (2013.01); *H04L 67/12* (2013.01)

(58) Field of Classification Search
    CPC .................................................. G05D 1/0214
    See application file for complete search history.

(56) References Cited

U.S. PATENT DOCUMENTS

| | | | |
|---|---|---|---|
| 6,665,614 B2 | 12/2003 | Sekiguchi | |
| 7,433,772 B2 | 10/2008 | Isaji et al. | |
| 8,195,394 B1 | 6/2012 | Zhu et al. | |
| 8,301,374 B2 | 10/2012 | Surampudi et al. | |
| 8,571,743 B1 | 10/2013 | Cullinane | |
| 8,594,919 B2 | 11/2013 | Munakata | |
| 8,620,025 B2 | 12/2013 | Higuchi et al. | |
| 8,676,500 B1 | 3/2014 | Walsh | |
| 8,818,641 B2 | 8/2014 | Yester | |
| 9,046,047 B2 | 6/2015 | Sangameswaran et al. | |
| 9,069,653 B2 | 6/2015 | Be et al. | |
| 9,443,163 B2 | 9/2016 | Springer | |
| 9,459,623 B1 | 10/2016 | Raghu | |
| 9,529,087 B2 | 12/2016 | Olshansky et al. | |
| 10,296,010 B2* | 5/2019 | Cohen | G05D 1/0246 |
| 2010/0250064 A1 | 9/2010 | Ota et al. | |
| 2015/0077560 A1 | 3/2015 | Zhang et al. | |
| 2015/0166062 A1 | 6/2015 | Johnson et al. | |
| 2016/0167582 A1 | 6/2016 | Chen et al. | |
| 2016/0342850 A1 | 11/2016 | Elimalech et al. | |
| 2017/0113665 A1 | 4/2017 | Mudalige et al. | |
| 2017/0131719 A1 | 5/2017 | Micks | |
| 2017/0193384 A1 | 7/2017 | Mudaliger et al. | |
| 2017/0205825 A1 | 7/2017 | Wang et al. | |
| 2017/0206426 A1 | 7/2017 | Schrier et al. | |
| 2018/0082587 A1* | 3/2018 | Wan | B60W 50/14 |
| 2018/0259957 A1* | 9/2018 | Charrow | G05D 1/0088 |
| 2018/0297592 A1* | 10/2018 | Kim | B60W 30/0956 |

* cited by examiner

*Primary Examiner* — Bao Long T Nguyen
*Assistant Examiner* — Michael A Berns
(74) *Attorney, Agent, or Firm* — Rankin, Hill & Clark LLP (57) ABSTRACT

A computer-implemented method for intersection control includes detecting an uncontrolled intersection ahead of the first vehicle travelling along a first road. The uncontrolled intersection includes an entry to a second road. The method includes detecting a start point of the entry and an end point of the entry with respect to the first vehicle using curb detection. The method includes predicting intent of a second vehicle to traverse through the entry, and controlling the first vehicle to allow the traversal through the entry by the second vehicle.

20 Claims, 6 Drawing Sheets

SYSTEM AND METHOD FOR CONTROLLING A VEHICLE AT AN UNCONTROLLED INTERSECTION WITH CURB DETECTION

BACKGROUND

Some vehicles can provide automated control technology and automated driver assistance with little or no user input. For example, vehicles can be controlled to navigate and traverse a route of travel with little or no user input. This can include automated driver assistance systems that automatically apply braking, apply acceleration, steer the vehicle, and so forth. When traversing a route and applying automatic controls, it is important for the vehicle to accurately detect traffic scenarios, navigate intersections, and handle traffic rules for collision mitigation and traffic flow management.

BRIEF DESCRIPTION

According to one aspect, a computer-implemented method for intersection control includes detecting an uncontrolled intersection ahead of a first vehicle traveling along a first road. The uncontrolled intersection includes an entry to a second road. The method includes detecting a start point of the entry and an end point of the entry with respect to the first vehicle using curb detection and predicting intent of a second vehicle to traverse through the entry. Further, the method includes controlling the first vehicle to allow the traversal through the entry by the second vehicle.

According to another aspect, a system for intersection control includes a sensor system to capture road data about boundary barriers along a first road in an environment surrounding a first vehicle traveling along the first road. The system also includes a processor operatively connected for computer communication to the sensor system and vehicle communication network. The processor detects an uncontrolled intersection ahead of the first vehicle based on the road data. The uncontrolled intersection includes an entry between the first road and a second road. The processor detects a start point of the entry and an end point of the entry based on the road data, and predicts intent of a second vehicle to traverse through the entry. The processor controls the first vehicle to allow the traversal through the entry by the second vehicle.

According to a further aspect, a non-transitory computer-readable storage medium including instructions that when executed by a processor, cause the processor to detect an uncontrolled intersection ahead of a first vehicle traveling along a first road. The uncontrolled intersection includes an entry to a second road. The processor is also caused to detect a start point of the entry and an end point of the entry with respect to the first vehicle using curb detection on the first road and the second road. The processor is also caused to predict a traversal through the entry by a second vehicle, and control the first vehicle to allow the traversal through the entry by the second vehicle.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device, vehicle, vehicle computing device, infrastructure device, roadside device) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

"Disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware based controls, interfaces, touch screens, touch pads or plug and play devices. An "output device" includes, but is not limited to: display devices, and other devices for outputting information and functions.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

"Vehicle display", as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of the vehicle, for example, on the dashboard or center console. In some embodiments, the display is part of a portable device (e.g., in possession or associated with a vehicle occupant), a navigation system, an infotainment system, among others.

"Vehicle control system" and/or "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

I. System Overview

Figure 1A:
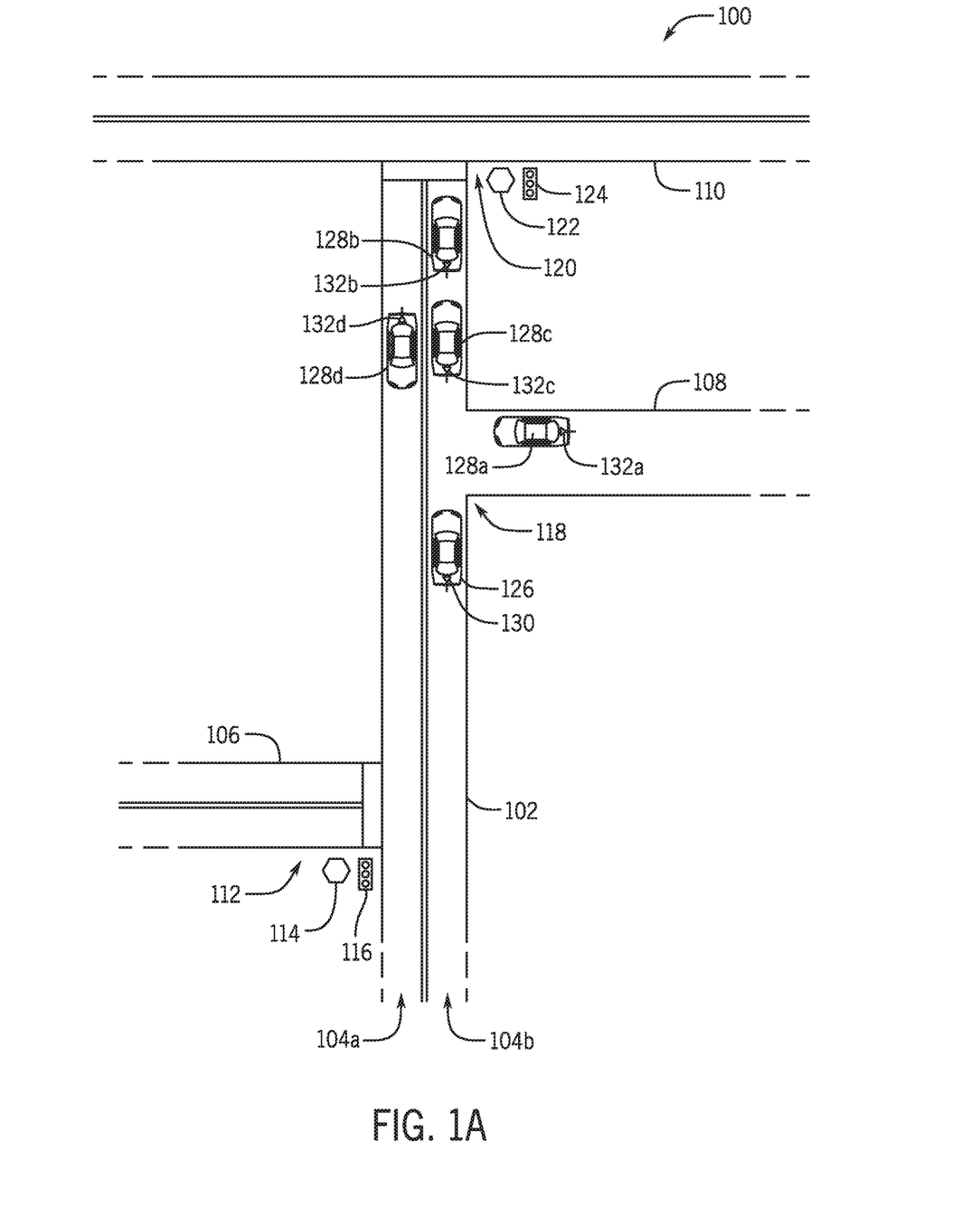
FIG. 1A is a traffic scenario including an uncontrolled intersection located to the right of a host vehicle and a controlled intersection according to an exemplary embodiment.

The systems and methods discussed herein are generally directed to automatic control of a vehicle traversing a road with an uncontrolled intersection and/or a controlled intersection using curb detection. Referring now to the drawings, wherein the showings are for purposes of illustrating one or more exemplary embodiments and not for purposes of limiting the same, FIG. 1A is an illustrative example of a traffic scenario 100 including an uncontrolled intersection and controlled intersections. More specifically, the traffic scenario 100 includes a first road 102 having a first lane 104a and a second lane 104b. The first road 102 intersects with a second road 106, a third road 108, and a fourth road 110. It is understood that any number of roads, lanes, and intersections other than that shown in FIG. 1A can be implemented with the methods and system discussed herein.

As mentioned briefly above, FIG. 1A includes controlled intersections and an uncontrolled intersection. A controlled intersection, as used herein, is an intersection in which an entrance into the intersection from any of the approaches (e.g., roads) is controlled by a regulatory sign or traffic signal (e.g., traffic light, yield sign, stop sign, or other traffic indicators). Thus, the regulatory sign or traffic signal is used to implement traffic rules and therefore control traffic at the intersection. An uncontrolled intersection, as used herein, is an intersection in which an entrance into the intersection from any of the approaches is not controlled by a regulatory sign or a traffic signal (e.g., traffic light, yield sign, stop sign, or other traffic indicators). Uncontrolled intersections can include intersections in rural or residential areas (e.g., driveways, paths), private driveways, commercial entrance roads (e.g., shopping centers, stores), among others.

Accordingly, in FIG. 1A, the first road 102 intersects with the second road 106 at a controlled intersection 112. The controlled intersection 112 includes a traffic indicator 114 (i.e., a stop sign) and a traffic indicator 116 (i.e., a traffic signal). The first road 102 also intersects with the third road 108 at an uncontrolled intersection 118. As can been seen, traffic at the uncontrolled intersection 118 is not controlled by a regulatory sign or a traffic signal. Further, the first road 102 intersects with the fourth road 110 at a controlled intersection 120. The controlled intersection 120 includes a traffic indicator 122 (i.e., a stop sign) and a traffic indicator 124 (i.e., a traffic signal).

In FIG. 1A, the traffic scenario 100 includes a first vehicle 126 (e.g., a host vehicle) and one or more remote vehicles, namely, a second vehicle 128a, a third vehicle 128b, a fourth vehicle 128c, and a fifth vehicle 128d. In FIG. 1A, the first vehicle 126 is travelling along the first road 102 in the second lane 104b and is approaching the uncontrolled intersection 118 from the first road 102. The second vehicle 128a is approaching the uncontrolled intersection 118 from the third road 108. The third vehicle 128b is approaching and/or stopped at the controlled intersection 120. The fourth vehicle 128c is travelling along the first road 102, is positioned behind the third vehicle 128b, and has passed the uncontrolled intersection 118. The fifth vehicle 128d represents oncoming traffic and is travelling along the first road 102 in the first lane 104a in the opposite travel direction of the first vehicle 126 (i.e., in the first lane 104a).

The intersections and traffic flow present in the traffic scenario 100 can present challenging traffic situations for the vehicles involved in the traffic scenario 100. For example, when to wait or proceed at an intersection, when to leave space for another vehicle to enter an intersection, whether to block an intersection or allow an opening at an intersection, among others. As will be discussed with the methods and systems herein, one or more of said vehicles involved with the traffic scenario 100 can include automated control technology and/or automated driver assistance to manage these traffic situations.

In some embodiments, these systems and methods can be implemented using vehicle sensors for data sensing of other vehicles, traffic, and curb detection. Vehicle sensing systems will be discussed further herein. In other embodiments, these systems and methods can be implemented in whole or in part using a communication network. For example, the first vehicle 126 can be controlled, in part, based on data communicated via a communication network. For example, the first vehicle 126, the second vehicle 128a, the third vehicle 128b, the fourth vehicle 128c, and the fifth vehicle 128d can communicate data as part of a communication network, which will be described in more detail with FIG. 2. Thus, in some embodiments, the first vehicle 126, the second vehicle 128a, the third vehicle 128b, the fourth vehicle 128c, and the fifth vehicle 128d can transmit, receive, and/or exchange communications including data, messages, images, and/or other information with one another, other vehicles, user, or infrastructures, using any type of wired and/or wireless communication protocols or systems that enable the vehicles for computer communication as discussed herein. For example, in the embodiments discussed herein, the examples are provided with respect to communicating via Dedicated Short Range Communications (DSRC). However, it is understood that other types of computer communication can be used, for example, cellular network communication (e.g., 5G), among others.

As shown in FIG. 1A, the first vehicle 126 is equipped with a vehicle-to-vehicle (V2V) transceiver 130 that can exchange messages and information with other vehicles, users, or infrastructures that are operable for computer communication with the first vehicle 126. For example, the V2V transceiver 130 can communicate with the second vehicle 128a via a V2V transceiver 132a, the third vehicle 128b via a V2V transceiver 132b, the fourth vehicle 128c via a V2V transceiver 132c, and the fifth vehicle 128d via a V2V transceiver 132d. Further, as mentioned above, one or more of the vehicles in FIG. 1A can communicate with road infrastructures, for example, the traffic indicator 114, the traffic indicator 116, the traffic indicator 122, and/or the traffic indicator 124. Although not shown in FIG. 1A, one or more of the traffic indicators can include components (e.g., transceivers) operable for communication. As another example, information can also be communicated from other types of devices (e.g., Internet of Things). For example, one or more of the vehicles in FIG. 1A can communicate with a garage door system (not shown) that could provide information about a vehicle entering or exit a road within the traffic scenario 100. In some embodiments, these devices that are operably connected for computer communication can be referred to as road side equipment (RSE) devices or connected to RSE devices.

As mentioned above and as will be discussed in more detail herein, the first vehicle 126 can be controlled, in part, based on data sensed by the first vehicle 126 and/or data communicated using a vehicle communication network. In one embodiment, vehicle sensors of one or more of the vehicles within the traffic scenario 100 can be used to obtain road data about the environment surrounding the first vehicle 126, vehicle data about the second vehicle 128a and/or an environment surrounding the second vehicle 128a, and/or traffic data about other vehicles and traffic in the environment surrounding the first vehicle 126. In other embodiments, infrastructure (e.g., traffic indicators, RSE) can be used to sense road data, vehicle data, and/or traffic data. This data can be communicated to the first vehicle 126 and used for control of the first vehicle 126. Infrastructure based sensing is particularly helpful in situations where one or more of the vehicles shown in traffic scenario 100 are not equipped for computer communication. This type of roadway infrastructure sensing is described is U.S. application Ser. No. 15/824,313 filed on Nov. 28, 2017, which is incorporated herein by reference.

Figure 1B:
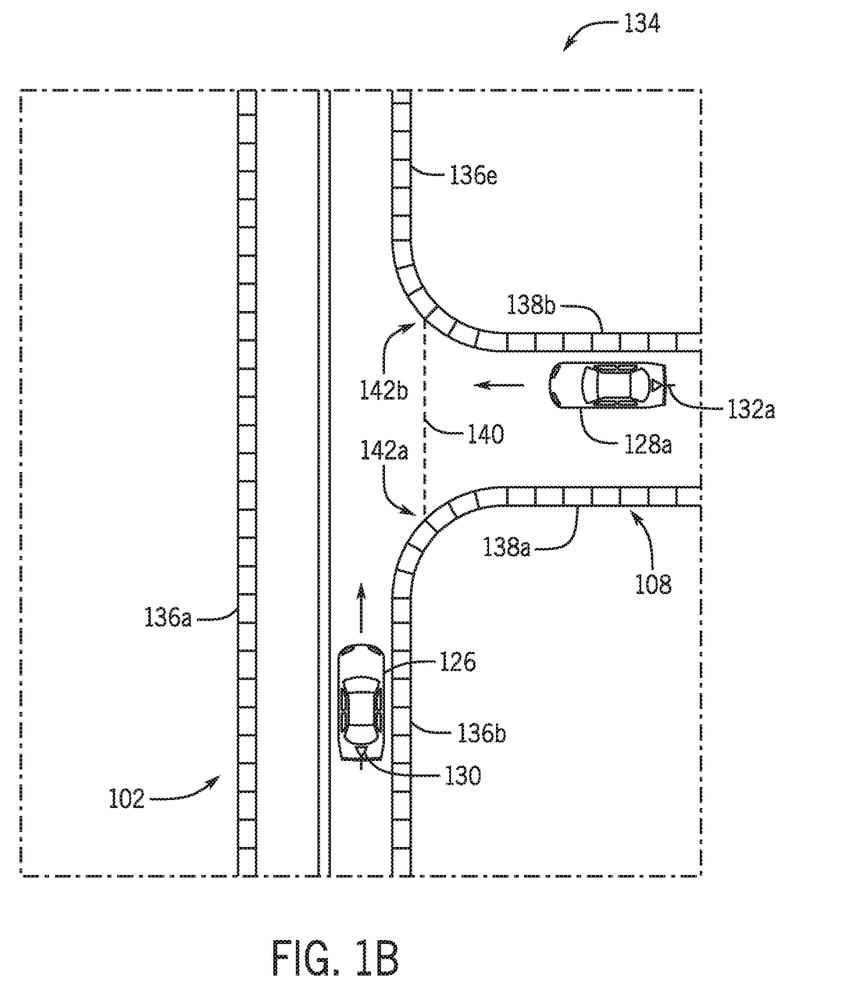
FIG. 1B is a detailed view of the uncontrolled intersection of FIG. 1A according to an exemplary embodiment.

In one embodiment, using the road data mentioned above, curb data can be extracted for detecting curbs and road boundaries that can form part of an intersection. Based on the road data, particulars about an intersection are determined and automated control of the first vehicle 126 can be implemented for intersection control. Curbs and road boundaries will now be discussed in more detail with reference to FIG. 1B. FIG. 1B illustrates a detailed view 134 of the uncontrolled intersection 118 of FIG. 1A. In FIG. 1B, the first road 102 is defined by curb/road boundaries, namely, a curb boundary 136a, a curb boundary 136b, and a curb boundary 136c. The third road 108 is defined by a curb boundary 138a, and a curb boundary 138b. The uncontrolled intersection 118 has an entry 140 that is defined by a start point 142a and an end point 142b. The entry 140 is an area of ingress from the first road 102 to the third road 108 and/or an area of egress from the third road 108 to the first road 102, or vice versa. Thus, the entry 140 is a portal or passage from the start point 142a to the end point 142b where one or more vehicles can travel through. As will be discussed herein, using curb detection, the first vehicle 126 can be controlled with respect to the entry 140 and/or the second vehicle 128a. In other embodiments, the first vehicle 126 can be controlled with respect to the controlled intersection 112, the controlled intersection 120, the third vehicle 128b, the fourth vehicle 128c, and/or the fifth vehicle 128d.

The embodiments shown in FIGS. 1A and 1B describe situations where the uncontrolled intersection 118 is ahead of the first vehicle 126a and includes an entry to the third road 108 which is to the right of the first vehicle 126a. Thus, the first vehicle 126a is controlled with respect to the entry 140 to the right of the first vehicle 126a and general traffic within the second lane 104b. However, it is understood that the methods and systems can also be implemented with other traffic scenarios. For example, with reference to FIG. 1C, a traffic scenario 100' is shown similar to the traffic scenario 100 of FIG. 1A, but including a fifth road 144 creating an uncontrolled intersection 146 with the first road 102. Here, the first vehicle 126 is travelling along the second lane 104b and the second vehicle 128a is approaching the uncontrolled intersection 146 from the fifth road 144.

Figure 1C:
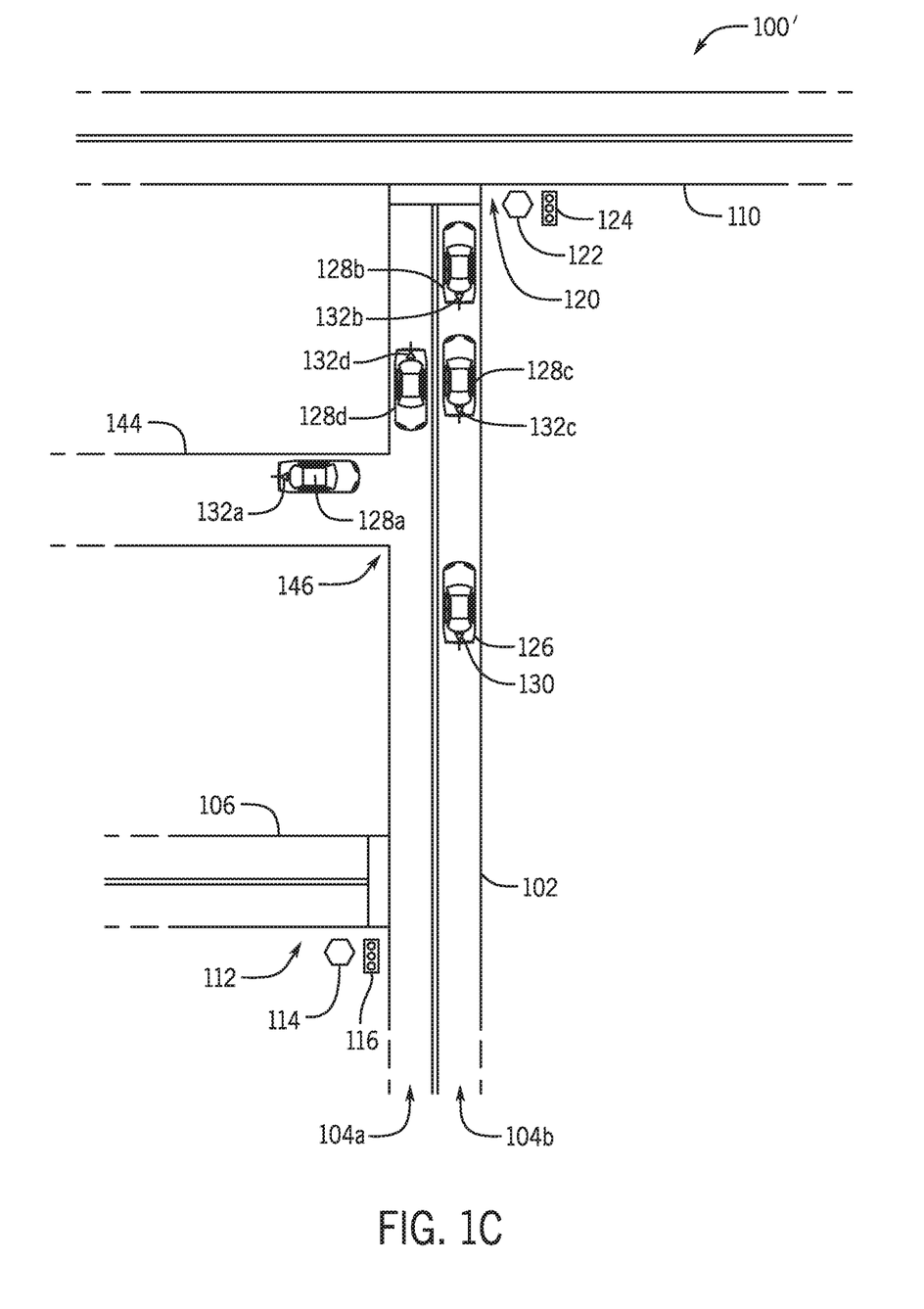
FIG. 1C a traffic scenario including an uncontrolled intersection located to the left of the host vehicle and a controlled intersection according to an exemplary embodiment.
Figure 1D:
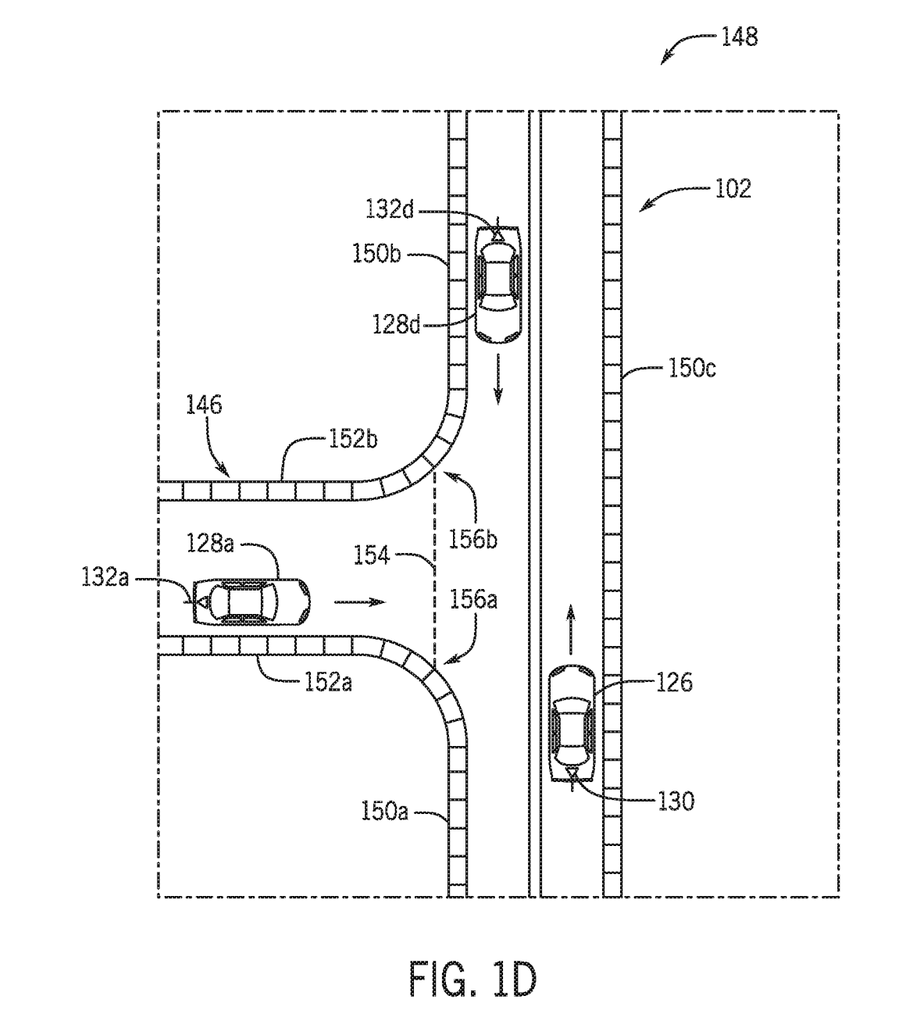
FIG. 1D is a detailed view of the uncontrolled intersection of FIG. 1C according to an exemplary embodiment.

FIG. 1D illustrates a detailed view 148 of the traffic scenario 100', similar to the detailed view 134 in FIG. 1B of the traffic scenario 100 of FIG. 1A. In FIG. 1D, the first road 102 is defined by curb/road boundaries, namely, a curb boundary 150a, a curb boundary 150b, and a curb boundary 150c. The fifth road 144 is defined by a curb boundary 152a, and a curb boundary 152b. The uncontrolled intersection 146 has an entry 154 that is defined by a start point 156a and an end point 156b. The entry 154 is an area of ingress from the first road 102 to the fifth road 144 and/or an area of egress from the fifth road 144 to the first road 102, or vice versa. Thus, the entry 154 is a portal or passage from the start point 156a to the end point 156b where one or more vehicles can travel through. As will be discussed herein, using curb detection, the first vehicle 126 can be controlled with respect to the entry 154 and/or the fifth vehicle 128d. In other embodiments, the first vehicle 126 can be controlled with respect to the controlled intersection 112, the controlled intersection 120, the third vehicle 128b, the fourth vehicle 128c and/or the fifth vehicle 128d.

Figure 2:
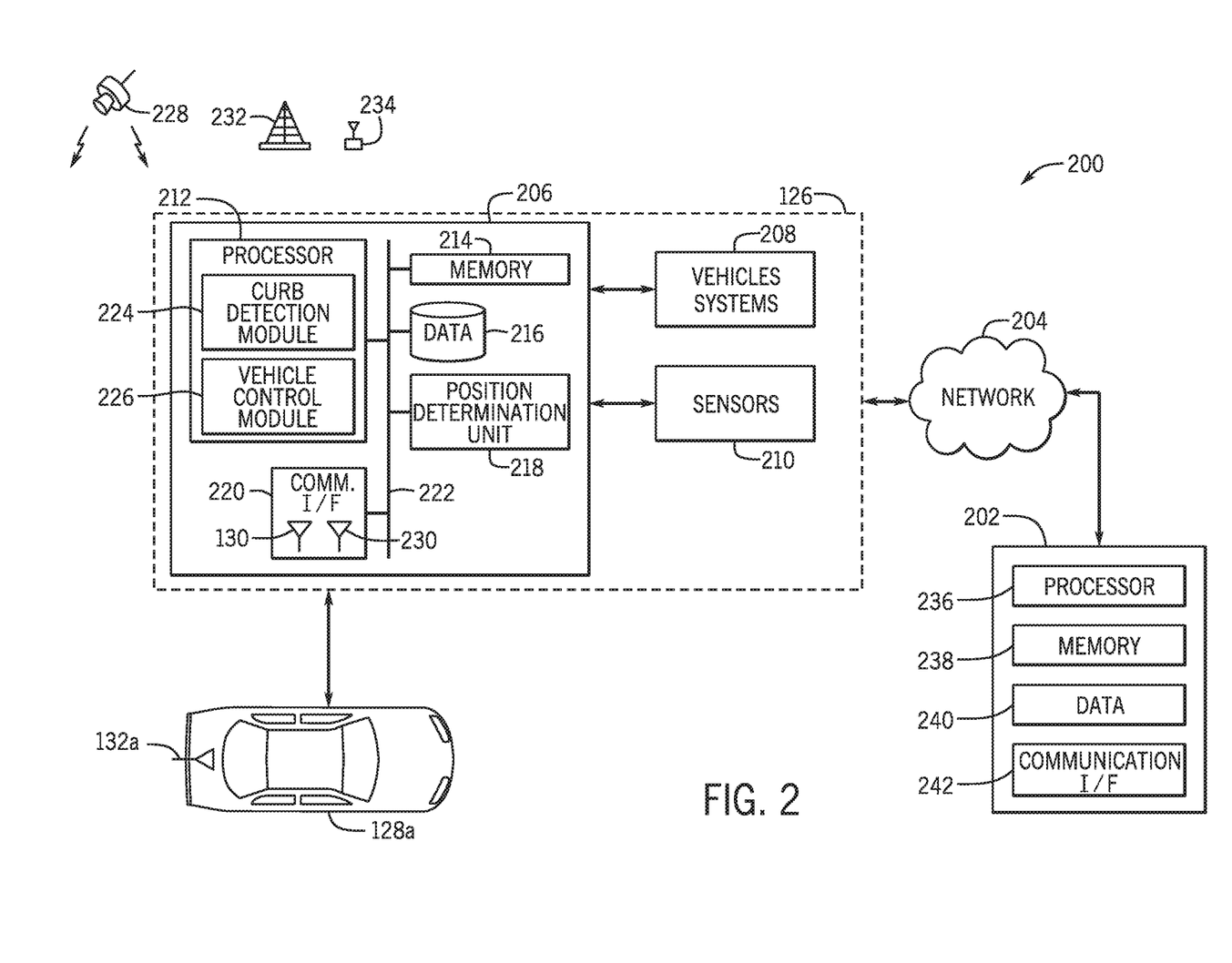
FIG. 2 is a schematic diagram of a vehicle communication network for implementing intersection control according to an exemplary embodiment.

It is understood that the embodiments discussed herein can be implemented with different traffic scenarios other than that shown in FIGS. 1A, 1B, 1C, and 1D. For example, in some embodiments, a parallel parking space (not shown) along the first road 102 can be considered an uncontrolled intersection, where the boundaries of the parallel parking space define the entry to the parallel parking space (e.g., the start and end points). Other implementations and traffic scenarios can also be contemplated. The systems and methods discussed herein, including the illustrative examples of FIGS. 1A, 1B, 1C, and 1D will now be described with reference to FIG. 2, a schematic view of an operating environment 200 according to an exemplary embodiment is shown. One or more of the components of the operating environment 200 can be considered in whole or in part a vehicle communication network. In FIG. 2, a block diagram of the first vehicle 126 is shown with a simplified block diagram of the second vehicle 128a, a block diagram of a remote server 202, and a network 204. It is understood that the second vehicle 128a, the third vehicle 128b, and fourth vehicle 128c, the fifth vehicle 128d, and/or the remote server 202 can include one or more of the components and/or functions discussed herein with respect to the first vehicle 126. Thus, it is understood that although not shown in FIG.

2, one or more of the components of the first vehicle 126, can also be implemented with the second vehicle 128a, the third vehicle 128b, the fourth vehicle 128c, the fifth vehicle 128d, the remote server 202, other entities, traffic indicators, and/or devices (e.g., V2I devices, V2X devices) operable for computer communication with the first vehicle 126 and/or with the operating environment 200. Further, it is understood that the components of the first vehicle 126 and the operating environment 200, as well as the components of other systems, hardware architectures, and software architectures discussed herein, can be combined, omitted, or organized into different architectures for various embodiments.

In FIG. 2, the first vehicle 126 includes a vehicle computing device (VCD) 206, vehicle systems 208, and sensors 210. Generally, the VCD 206 includes a processor 212, a memory 214, a data store 216, a position determination unit 218, and a communication interface (I/F) 220, which are each operably connected for computer communication via a bus 222 and/or other wired and wireless technologies discussed herein. Referring again to the first vehicle 126, the VCD 206, can include provisions for processing, communicating and interacting with various components of the first vehicle 126 and other components of the operating environment 200, including the second vehicle 128a and the remote server 202. In one embodiment, the VCD 206 can be implemented with the first vehicle 126, for example, as part of a telematics unit, a head unit, an infotainment unit, an electronic control unit, an on-board unit, or as part of a specific vehicle control system, among others. In other embodiments, the VCD 206 can be implemented remotely from the first vehicle 126, for example, with a portable device (not shown), a remote device (not shown), or the remote server 202, connected via the network 204.

The processor 212 can include logic circuitry with hardware, firmware, and software architecture frameworks for facilitating control of the first vehicle 126 and/or the second vehicle 128a. Thus, in some embodiments, the processor 212 can store application frameworks, kernels, libraries, drivers, application program interfaces, among others, to execute and control hardware and functions discussed herein. For example, in FIG. 2, the processor 212 can include a curb detection module 224 and a vehicle control module 226, although it is understood that the processor 212 can be configured into other architectures. Further, in some embodiments, the memory 214 and/or the data store (e.g., disk) 216 can store similar components as the processor 212 for execution by the processor 212.

The position determination unit 218 can include hardware (e.g., sensors) and software to determine and/or acquire position data about the first vehicle 126. For example, the position determination unit 218 can include a global positioning system (GPS) unit (not shown) and/or an inertial measurement unit (IMU) (not shown). Thus, the position determination unit 218 can provide a geoposition of the first vehicle 126 based on satellite data from, for example, a global position source 228, or from any Global Navigational Satellite infrastructure (GNSS), including GPS, Glonass (Russian) and/or Galileo (European). Further, the position determination unit 218 can provide dead-reckoning data or motion data from, for example, a gyroscope, accelerometer, magnetometers, among other sensors (not shown). In some embodiments, the position determination unit 218 can be a navigation system that provides navigation maps and navigation information to the first vehicle 126.

The communication interface 220 can include software and hardware to facilitate data input and output between the components of the VCD 206 and other components of the operating environment 200. Specifically, the communication interface 220 can include network interface controllers (not shown) and other hardware and software that manages and/or monitors connections and controls bi-directional data transfer between the communication interface 220 and other components of the operating environment 200 using, for example, the communication network 204.

More specifically, and as mentioned with FIGS. 1A and 1B above, the VCD 206 can exchange data and/or transmit messages with other compatible vehicles and/or devices via the V2V transceiver 130 or other communication hardware and protocols. For example, the V2V transceiver 130 can exchange data with the second vehicle 128a via the V2V transceiver 132a. As mentioned above with FIGS. 1A and 1B, in the embodiments described herein, the computer communication can be implemented using Dedicated Short Range Communications (DSRC). However, it is understood that the communication described herein can be implemented with any communication or network protocol described above. In some embodiments, the first vehicle 126 and the second vehicle 128a can exchange data utilizing a wireless network antenna 232, roadside equipment (RSE) 234, and/or the communication network 204 (e.g., a wireless communication network) or other wireless network connections.

As mentioned above, in some embodiments, data transmission can be executed at and/or with other infrastructures and servers. For example, in FIG. 2, the VCD 206 can transmit and receive information directly or indirectly to and from the remote server 202 over the communication network 204. The remote server 202 can include a remote processor 236, a memory 238, data 240, and a communication interface 242 that are configured to be in communication with one another. Thus, in FIG. 2, the V2V transceiver 130 can be used by the VCD 206 to receive and transmit information to and from the remote server 202 and other servers, processors, and information providers through the communication network 204. In alternative embodiments, a radio frequency (RF) transceiver 230 of the first vehicle 126 can be used to receive and transmit information to and from the remote server 202. In some embodiments, the VCD 206 can receive and transmit information to and from the remote server 202 including, but not limited to, traffic data, road data, curb data, vehicle location and heading data, high-traffic event schedules, weather data, or other transport related data. In some embodiments, the remote server 202 can be linked to multiple vehicles (e.g., the second vehicle 128a), other entities, traffic infrastructures, and/or devices through a network connection, such as via the wireless network antenna 232, the road side equipment 234, and/or other network connections.

Referring again to the first vehicle 126, the vehicle systems 208 can include any type of vehicle control system and/or vehicle described herein to enhance the first vehicle 126 and/or driving of the first vehicle 126. For example, the vehicle systems 208 can include autonomous driving systems, driver-assist systems, adaptive cruise control systems, lane departure warning systems, merge assist systems, freeway merging, exiting, and lane-change systems, collision warning systems, integrated vehicle-based safety systems, and automatic guided vehicle systems, or any other advanced driving assistance systems (ADAS). As will be described, one or more of the vehicle systems 208 can be controlled according the systems and methods discussed herein.

The sensors 210, which can be implemented with the vehicle systems 208, can include various types of sensors for use with the first vehicle 126 and/or the vehicle systems 208 for detecting and/or sensing a parameter of the first vehicle 126, the vehicle systems 208, and/or the environment surrounding the first vehicle 126. For example, the sensors 210 can provide data about vehicles in proximity to the first vehicle 126, for example, the second vehicle 128a. The vehicle sensors 210 can also be used for curb detection and/or road edge detection for detecting an intersection. For example, the sensors 210 can include visions sensors (e.g., imaging devices, cameras) and/or ranging sensors (e.g., RADAR, LIDAR). It is understood that the vehicle sensors 210 can be disposed in one or more portions of the first vehicle 126. For example, although not shown in FIG. 2, the vehicle sensors 210 could be integrated into a dashboard, seat, seat belt, door, bumper, front, rear, corners, dashboard, steering wheel, center console, roof or any other portion of the first vehicle 126. In other cases, however, the sensors 210 could be portable sensors worn by a driver (not shown), integrated into a portable device (not shown), carried by the driver (not shown), integrated into an article of clothing (not shown) worn by the driver, or integrated into the body of the driver (e.g. an implant) (not shown).

As mentioned above, the sensors 210 can include ranging sensors. For example, a front long range RADAR and/or a front mid-range RADAR. The front long range RADAR can measure distance (e.g., lateral, longitudinal) and speed of objects surrounding the first vehicle 126. For example, the first long range RADAR can measure distance and speed of other vehicles (e.g., the second vehicle 128a, the third vehicle 128b, the fourth vehicle 128c, and the fifth vehicle 128d) and/or other objects (e.g., curbs, road edges) and entities surrounding the first vehicle 126. In other embodiments, the vehicle sensors 210 can include a plurality of RADARs in different location of the first vehicle 126. In some embodiments discussed herein, curb detection can be performed using sparse measurement data from sensing technologies such as ranging sensors (e.g., RADAR, LIDAR).

Using the system and network configuration discussed above, the first vehicle 126 can detect traffic situations involving uncontrolled intersection and/or controlled intersections and appropriate automatic control can be implemented to handle intersection control and balance traffic flow. Detailed embodiments describing exemplary methods using the system and network configuration discussed above will now be discussed in detail.

II. Methods for Intersection Control

Figure 3:
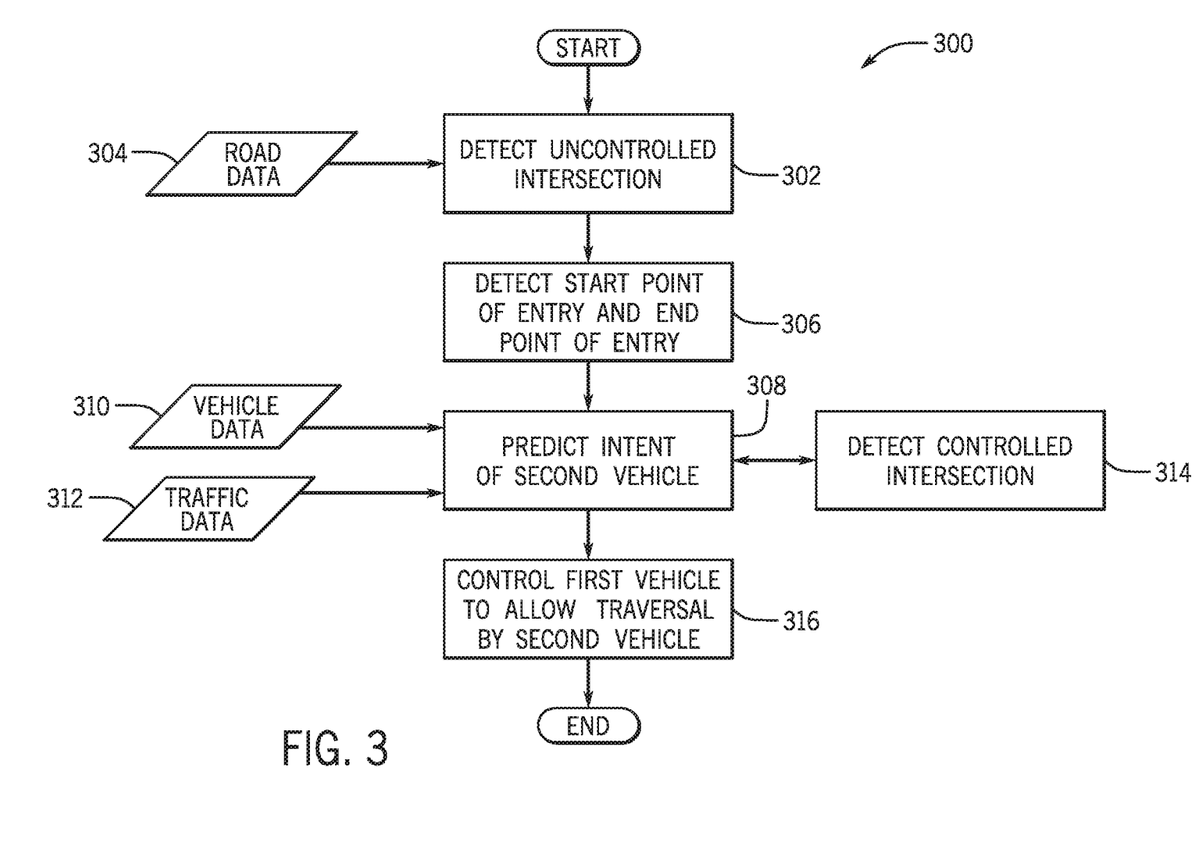
FIG. 3 is a process flow diagram of a method for intersection control according to an exemplary embodiment.

Referring now to FIG. 3 a process flow diagram of a method 300 for intersection control according to an exemplary embodiment is shown. The method 300 will be discussed primarily with reference to FIGS. 1A, 1B showing the uncontrolled intersection 118 to a right side of the first vehicle 126a. However, the embodiment will also be described with respect to the illustrative embodiment shown in FIGS. 1C and 1D having the uncontrolled intersection 146. Further, FIG. 3 will be discussed with reference to FIG. 2. It is understood that the blocks of the method 300 can be combined, omitted, or organized into different architectures for various embodiments. At block 302, the method 300 includes detecting an uncontrolled intersection. In particular, the processor 212 can detect the uncontrolled intersection 118 ahead of the first vehicle 126, which is travelling along the first road 102. The uncontrolled intersection 118 includes an entry 140 to the third road 108, and the entry 140 is located to a right side of the first vehicle 126. In FIGS. 1C and 1D, the uncontrolled intersection 146 includes an entry 154 to the fifth road 144, and the entry 154 is located to a right side of the first vehicle 126

More specifically, the processor 212 can identify (e.g., classify) an intersection as an uncontrolled intersection and detect the boundaries of the uncontrolled intersection using road data 304. For example, the processor 212 can use the sensors 210 (e.g., a sensory system) to capture road data 304 about boundary barriers along the first road 102, which is in an environment surrounding the first vehicle 126 traveling along the first road 102. The road data 304 can include, but is not limited to, data about road surface, curvature, terrain, road signs, structures, objects, traffic indicators, intersections, barriers, curbs, road edges, medians, or any other data about a road.

As discussed above, in some embodiments, the road data 304 can be communicated to the first vehicle 126 using road infrastructure devices operably connected for computer communication using, for example, the communication network 204. For example, the traffic indicator 122 and the traffic indicator 116 can be consider RSE devices and/or connected to an RSE device, for example, the RSE 234. These devices can include sensors (not shown) that capture road data 304 and communicate the road data 304 using the communication network 204 for use by the first vehicle 126. In further embodiments, the road data 304 can be captured by other vehicles (e.g., the second vehicle 128a, the third vehicle 128b, the fourth vehicle 128c, and the fifth vehicle 128d) and the road data 304 can be communicated to the first vehicle 126. For example, the other vehicles can include sensors (e.g., similar to the sensors 210) that capture road data 304, and communicate the road data 304 using the communication network 204.

Based on the road data 304, the processor 212 can identify an intersection as an uncontrolled intersection. For example, the road data 304 may indicate an intersection does not have any traffic signals that control traffic at the intersection and therefore classify the intersection as an uncontrolled intersection. As shown in FIG. 1A and 1B, the uncontrolled intersection 118 does not have any traffic indicators that control traffic at the uncontrolled intersection 118. In other embodiments, the processor 212 can use position data and/or navigation information from the position determination unit 218 to determine that an intersection is an uncontrolled intersection.

Additionally, based on the road data 304, the processor 212 can detect the boundaries of the uncontrolled intersection 118. In one embodiment, the sensors 210 (e.g., a sensory system) captures road data about boundary barriers along the first road 102, which is in an environment surrounding the first vehicle 126 traveling along the first road 102. For example, as mentioned above, road data 304 can be obtained from sparse measurement data from sensing technologies such as ranging sensors (e.g., RADAR, LIDAR). Thus, with respect to the example shown in FIG. 1B, the road data 304 can include sparse measurement data about the curb boundary 136a, the curb boundary 136b, and/or the curb boundary 136c. As mentioned above, the road data 304 can be captured by the first vehicle 126, the other vehicles, and/or road infrastructure. Curb data about said boundaries can be extracted from the road data 304 and various curb detection techniques can be implemented with the methods and systems discussed herein. For example, data from ranging sensors, vision sensors, any other sensors road map data, and any combination of such can be used. Further, any type of curb modeling can be implemented.

Accordingly, at block 306, the method 300 includes detecting a start point of the entry and an end point of the entry. As shown in FIG. 1B, and as discussed above, the entry 140 has the start point 142a and the end point 142b. The start point 142a of the entry 140 and the end point 142b of the entry 140 are curb boundaries located to the right side of the first vehicle 126. Using curb detection and the road data described above, the processor 212 can detect the start point 142a and the end point 142b of the entry 140 relative and/or with respect to the first vehicle 126.

As shown in FIG. 1B, in some embodiments, the start point 142a and the end point 142b are detected as curb corners or intersection curb corners. Thus, for example, the start point 142a can define a center point and/or a curb radius where the curb boundary 136b meets the curb boundary 138a thereby forming a curb corner denoting the start of the entry 140 of the uncontrolled intersection 118. Similarly, the end point 142b can define a center point and/or a curb radius where the curb boundary 136c meets the curb boundary 138b thereby forming a curb corner denoting the end of the entry 140 of the uncontrolled intersection 118.

In some embodiments, the start point 142a indicates a transition from an elevated surface (e.g., the curb boundary 136b) to the road surface of the entry 140, and the end point 142b indicates a transition from the road surface of the entry 140 to an elevated surface (e.g., the curb boundary 136c). It is appreciated that other types of boundaries or markers could also indicate the start point 142a and/or the end point 142b. Further, it is understood that the start point 142a and/or the end point 142b can be detected and defined as absolute position coordinates and/or relative position coordinates with respect to the first vehicle 126 and/or the second vehicle 128a.

In FIG. 1D the entry 154 is to the left of the first vehicle 126. The entry 154 has the start point 156a and the end point 156b. The start point 156a of the entry 154 and the end point 156b of the entry 154 are curb boundaries located to the left side of the first vehicle 126. As discussed above in detail with the entry 140 of FIG. 1B, using curb detection and the road data described above, the processor 212 can detect the start point 156a and the end point 156b of the entry 154 relative and/or with respect to the first vehicle 126.

Referring again the method 300, at block 308, the method 300 includes predicting an intent of the second vehicle 128a. Specifically, the processor 212 predicts the intent of the second vehicle 128a as to whether the second vehicle 128a will traverse through the entry 140. The intent of the second vehicle 128a can be based on vehicle data 310 and/or traffic data 312. The vehicle data 310 is data about the second vehicle 128a. For example, direction, speed, position, vehicle system data (e.g., data from a traffic signal indicator system (not shown)) of the second vehicle 128a, and other data about the second vehicle 128a and/or an environment surrounding the second vehicle 128a.

Similar to the road data 304, the vehicle data 310 can be captured and communicated in different ways. In one embodiment, the first vehicle 126 captures vehicle data 310. For example, using data from the ranging sensors and/or vision sensors (e.g., the sensors 210), the first vehicle 126 can detect the second vehicle 128a is approaching the entry 140. In another embodiment, the vehicle data 310 is captured by other vehicles (e.g., the third vehicle 128b, the fourth vehicle 128c, the fifth vehicle 128d), for example, using sensors on-board those vehicles, and can communicate the vehicle data 310 to the first vehicle 126 using, for example, the communication network 204. In other embodiments, the vehicle data 310 can be captured and communicated by the second vehicle 128a. In one embodiment, the second vehicle 128a can transmit a message including its direction, its speed, and its intent to turn (i.e., vehicle data 310) onto the first road 102 and/or enter the first road 102. In another embodiment, the first vehicle 126 can receive vehicle data 310 stored at the server 202. The server 202 can store historical data about the second vehicle 128a which can be used to determine the intent of the second vehicle 128a.

Additionally, as mentioned above, the vehicle data 310 can be captured and communicated by infrastructure devices and other devices operably connected for computer communication. As an illustrative example, the third road 108 can be a driveway including a garage (not shown) with an automatic garage door system (not shown) that is operably connected for computer communication, using for example, the communication network 204. For example, a garage door system (not shown) could communicate to the first vehicle 126 that the second vehicle 128a has opened the garage and thus the second vehicle 128a is entering and/or exiting the garage.

Communication of vehicle data 310 can be particularly useful to determine whether the second vehicle 128a is moving or is stopped. The sensors 210 (e.g., ranging sensors) of the first vehicle 126 may be able to provide vehicle data 310 indicating the second vehicle 128a is present, but this type of data does not provide an indication of movement of the second vehicle 128a. Thus, if the first vehicle 126 and the second vehicle 128a are both equipped for computer communication but the second vehicle 128a has not established an operable connection with the first vehicle 126, this can indicate to the first vehicle 126 that the vehicle is OFF and is not moving. Otherwise, if the second vehicle 128a has established an operable connection, the second vehicle 128a can communicate its intention to the first vehicle 126 as discussed above.

Thus, in some embodiments, the capture of vehicle data 310 and prediction of intent of the second vehicle 128a can be selective based on whether the first vehicle 126 can detect the second vehicle 128a using the sensors 210 (e.g., ranging sensors). For example, if the first vehicle 126 senses the second vehicle 128a using the sensors 210, the first vehicle 126 can use the vehicle data 310 captured by the sensors 210. Otherwise, if the first vehicle 126 does not sense the second vehicle 128a using the sensors 210, the first vehicle 126 can opt to communicate with the second vehicle 128a or the other vehicles using the communication network 204 to request and/or receive vehicle data 310.

Further, in some embodiments, the processor 212 can use the vehicle data 310 and/or traffic data 312 to predict the intent of the second vehicle 128a. Traffic data 312 can include, but is not limited to, data about a current state of a traffic light, a time until the next signal change, a next signal state, a speed and/or location of other vehicles near a controlled intersection, traffic flow near a controlled intersection, historical traffic data, among others. Traffic data 312 can provide an indication as to whether the second vehicle 128a will traverse the entry 140 based on current or future traffic conditions. Similar to the road data 310, traffic data 312 can be captured by the first vehicle 126 (e.g., using sensors 210) and/or communicated using the communication network 204. For example, traffic data 312 can be captured by the second vehicle 128a, the third vehicle 128b, the fourth vehicle 128c, and/or the fifth vehicle 128d, and communicated to the first vehicle 126. As mentioned above, in other embodiments, the processor 212 can receive traffic data 312 using the communication network 204 from, for example, traffic indicators and/or the RSE 234, and use the traffic data 312 to identify an intersection as a controlled intersection.

In some embodiments, the method 300 at block 314 can include detecting a controlled intersection located along the first road 102 and ahead of the uncontrolled intersection 118 and the first vehicle 126. For example, the processor 212 can identify (e.g., classify) an intersection in proximity to the uncontrolled intersection 118 as a controlled intersection (e.g., the controlled intersection 112 and/or the controlled intersection 120) based on, for example, the traffic data 312. As mentioned above, the processor 212 can receive the traffic data 312 using the communication network 204 from, for example, traffic indicators and/or RSE 234, and use the traffic data 312 to identify an intersection as a controlled intersection. In other embodiments, the processor 212 can use map data, position data and/or navigation information from the position determination unit 218 to determine that an intersection is a controlled intersection.

The traffic data 312 can also be used to identify vehicles, traffic, and other characteristics about the controlled intersection and areas in proximity to the controlled intersections. As an illustrative example, the traffic indicator 124 can transmit traffic data 312 to the first vehicle 126 about the traffic indicator 124 and the controlled intersection 120. For example, the current state of the traffic indicator 124 (e.g., red for north-south, green for east-west), a time until the next signal change of the traffic indicator 124 (e.g., 10 seconds), a speed and a location of the third vehicle 128b, the fourth vehicle 128c, and/or the fifth vehicle 128d, among other data about the controlled intersection 120 and the traffic surrounding the controlled intersection 120.

In some embodiments, predicting the traversal through the entry 140 by the second vehicle 128a includes predicting a time of the traversal based on the traffic data 312. For example, a time of the traversal can be predicted based on a speed and location of the second vehicle 128a, a current state of the traffic indicator 124, and a time until the next signal change of the traffic indicator 124, among others. In one embodiment, the processor 212 can predict the traversal through the entry 140 by the second vehicle 128a by predicting traffic flow in proximity to the entry 140 based on the traffic data 312. For example, the processor 212 can predict the intent of the second vehicle 128a to traverse the entry 154 based on traffic flow in proximity to the uncontrolled intersection 145, for example, the oncoming fifth vehicle 128d. In some embodiments, the intent of the second vehicle 128a may also be based on an intent of another vehicle, for example, and intent to turn onto the third road 108 by oncoming traffic represented by the fifth vehicle 128d.

Referring again to the method 300 and the examples shown in FIGS. 1A and 1B, at block 316, the method 300 includes controlling the first vehicle 126 to allow the traversal through the entry 140 by the second vehicle 128a. The movement of the first vehicle 126 can include controlling a speed of the first vehicle 126 and/or controlling the first vehicle 126 to move in a forward or a reverse direction. For example, the processor 212 can control movement of the first vehicle 126 relative to the entry 140 as defined by the start point 142a of the entry 140 and the end point 142b of the entry 140 to allow the traversal through the entry 140 by the second vehicle 128a. More specifically, the processor 212 can control the first vehicle 126 to stop prior to the start point 142a of the entry 140 thereby allowing space for the second vehicle 128a to traverse the entry 140 and travel onto the first road 102.

In one embodiment, controlling the first vehicle 126 includes controlling movement of the first vehicle 126 to stop relative to the entry 140 to allow the traversal through the entry 140 by the second vehicle 128a at the time of the traversal predicted for the second vehicle 128a. For example, the processor 212 can control movement of the first vehicle 126 to stop prior to the start point 142a and prior to the time of traversal predicted for the second vehicle 128a. In another embodiment, the processor 212 controls movement of the first vehicle 126 relative to the entry 140 based on the traffic flow to allow the traversal through the entry 140 by the second vehicle 128a. This type of control can be based on the traffic data 312.

In a further embodiment, to allow the traversal through the entry 140 by the second vehicle 128a, the first vehicle 126 can be controlled to move relative to the entry 140 and/or other vehicles in proximity to the uncontrolled intersection 118 to provide an adequate space or gap for the second vehicle 128a to traverse the entry 140 or to prevent the first vehicle 126 from blocking the entry 140. Accordingly, the processor 212 can control movement of the first vehicle 126 to leave a gap between the first vehicle and the start point 142a of the entry 140, the end point 142b, or another vehicle (e.g., the fourth vehicle 128c). Thus, the gap can be defined from the front, center, or rear end of the first vehicle 126 to the start point 142a, the end point 142b, or the front, center, or rear end of the fourth vehicle 128c.

The size of the gap can be modified by the processor 212 based on whether the second vehicle 128a is oriented towards the entry 140 (e.g., facing forward) or away from the entry 140 (e.g., facing backward). Said differently, the size of the gap, and thus control of the movement of the first vehicle 126, can be controlled based on whether the second vehicle 128a is entering and/or exiting through the entry 140. In some embodiments, the first vehicle 126 can detect whether the second vehicle 128a is oriented towards or away from the entry 140 based on data from the sensors 210 (e.g., camera sensors) and/or using vehicle data 310 communicated using the communication network 204.

Additionally, block 316 can include transmitting a message about the movement of the first vehicle 126 to the second vehicle 128a using the communication network 204. More specifically, the processor 212 can transmit a message to the second vehicle 128a about the movement of the first vehicle 126 to provide an indicator to the second vehicle 128a that traversal through the entry 140 may be allowed by the first vehicle 126 (e.g., the first vehicle 126 is not blocking the traversal from the third road 108 to the first road 102 via the entry 140. Thus, the message can indicate whether the first vehicle 126 has stopped prior to the start point 142a. Accordingly, based on the system and methods discussed herein, control of the first vehicle 126 can be coordinated with respect to the uncontrolled intersection 118 and vehicles that wish to traverse the uncontrolled intersection 118.

The embodiments discussed herein can also be described and implemented in the context of computer-readable storage medium storing computer executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer-readable storage media excludes non-transitory tangible media and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for intersection control, comprising:
   detecting an uncontrolled intersection ahead of a first vehicle traveling along a first road, wherein the uncontrolled intersection includes an entry to a second road, and detecting the uncontrolled intersection includes detecting a start point of entry and an end point of the entry with respect to the first vehicle using curb detection;
   detecting a controlled intersection located along the first road and ahead of the uncontrolled intersection and the first vehicle;
   receiving traffic data from the controlled intersection using a vehicle communication network;
   predicting intent of a second vehicle to traverse through the entry by predicting a time of traversal based on the traffic data; and
   controlling the first vehicle based on the traffic data by controlling movement of the first vehicle to stop relative to the entry to allow the traversal through the entry by the second vehicle at the time of traversal.

2. The computer-implemented method of claim 1, wherein controlling the first vehicle includes controlling movement of the first vehicle relative to the entry as defined by the start point of the entry and the end point of the entry to allow the traversal through the entry by the second vehicle.

3. The computer-implemented method of claim 2, wherein controlling the first vehicle includes controlling the movement of the first vehicle to stop prior to the start point of the entry.

4. The computer-implemented method of claim 2, wherein controlling the first vehicle includes transmitting a message about the movement of the first vehicle to the second vehicle using the vehicle communication network.

5. The computer-implemented method of claim 1, wherein the start point of the entry and the end point of the entry are curb boundaries located to the right side of the first vehicle.

6. The computer-implemented method of claim 1, wherein predicting the intent of the second vehicle is based on vehicle data about the second vehicle.

7. The computer-implemented method of claim 6, wherein the second road is a driveway having an automatic garage door system located thereon, wherein the automatic garage door system communicates the vehicle data to the first vehicle using the vehicle communication network.

8. The computer-implemented method of claim 6, wherein the first vehicle selectively obtains the vehicle data about the second vehicle.

9. The computer-implemented method of claim 8, wherein if the first vehicle senses the second vehicle using sensors of the first vehicle, the first vehicle selectively obtains the vehicle data about the second vehicle using the sensors of the first vehicle, and wherein if the first vehicle does not sense the second vehicle using the sensors of the first vehicle, the first vehicle selectively obtains the vehicle data about the second vehicle from the second vehicle using the vehicle communication network.

10. A system for intersection control, comprising:
   a sensor system to capture road data about boundary barriers along a first road in an environment surrounding a first vehicle traveling along the first road; and
   a processor operatively connected for computer communication to the sensor system and a vehicle communication network, wherein the processor:
   detects an uncontrolled intersection ahead of the first vehicle based on the road data, wherein the uncontrolled intersection includes an entry between the first road and a second road;
   detects a start point of the entry and an end point of the entry based on the road data;
   detects a controlled intersection in proximity to the uncontrolled intersection;
   receives traffic data from the controlled intersection using the vehicle communication network;
   predicts intent of a second vehicle to traverse through the entry by predicting traffic flow in proximity to the entry based on the traffic data; and
   controls the first vehicle based on the traffic flow by controlling movement of the first vehicle relative to the entry to allow the traversal through the entry by the second vehicle.

11. The system of claim 10, wherein the processor transmits a message to the second vehicle about the movement of the first vehicle.

12. The system for intersection control of claim 10, wherein the processor controls the movement of the first vehicle relative to the entry as defined by the start point of the entry and the end point of the entry to allow the traversal through the entry by the second vehicle.

13. The system for intersection control of claim 12, wherein the processor controls the movement of the first vehicle to stop prior to the start point of the entry.

14. The system for intersection control of claim 10, wherein the start point of the entry and the end point of the entry are curb boundaries located to the right side of the first vehicle.

15. The system for intersection control of claim 10, wherein the processor predicts the intent of the second vehicle to traverse through the entry based on vehicle data about the second vehicle, and the first vehicle selectively obtains the vehicle data about the second vehicle.

16. A non-transitory computer-readable storage medium including instructions that when executed by a processor, cause the processor to:
   detect an uncontrolled intersection ahead of a first vehicle traveling along a first road, wherein the uncontrolled intersection includes an entry to a second road;
   detect a start point of the entry and an end point of the entry with respect to the first vehicle using curb detection on the first road and the second road;
   detect a controlled intersection in proximity to the uncontrolled intersection;
   receive traffic data from the controlled intersection using a vehicle communication network;
   predict intent of a second vehicle to traverse through the entry; and
   control the first vehicle based on the traffic data to allow the traversal through the entry by the second vehicle.

17. The non-transitory computer-readable storage medium of claim 16, wherein the processor controls movement of the first vehicle relative to the entry to allow the traversal through the entry by the second vehicle.

18. The non-transitory computer-readable storage medium of claim 16, wherein the processor controls the first vehicle to stop prior to the start point of the entry to allow the traversal through the entry by the second vehicle.

19. The non-transitory computer-readable storage medium of claim 16, wherein the processor transmits a message to the second vehicle about movement of the first vehicle.

20. The non-transitory computer-readable storage medium of claim 16, wherein the start point of the entry and the end point of the entry are curb boundaries located to the right side of the first vehicle.

* * * * *